United States Patent
Hannig et al.

(10) Patent No.: US 12,247,130 B2
(45) Date of Patent: Mar. 11, 2025

(54) LAMINATABLE INK

(71) Applicant: AKZENTA PANEELE + PROFILE GMBH, Kaisersesch (DE)

(72) Inventors: Hans-Jürgen Hannig, Bergisch Gladbach (DE); Felix Hüllenkremer, Koblenz (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 894 days.

(21) Appl. No.: 17/271,078

(22) PCT Filed: May 12, 2020

(86) PCT No.: PCT/EP2020/063200
§ 371 (c)(1),
(2) Date: Feb. 24, 2021

(87) PCT Pub. No.: WO2020/229474
PCT Pub. Date: Nov. 19, 2020

(65) Prior Publication Data
US 2021/0253883 A1    Aug. 19, 2021

(30) Foreign Application Priority Data
May 15, 2019 (EP) .................... 19174600

(51) Int. Cl.
C09D 11/101 (2014.01)
C09D 11/322 (2014.01)
C09D 11/36 (2014.01)
C09D 11/38 (2014.01)

(52) U.S. Cl.
CPC .......... C09D 11/101 (2013.01); C09D 11/322 (2013.01); C09D 11/36 (2013.01); C09D 11/38 (2013.01)

(58) Field of Classification Search
CPC ..... C09D 11/101; C09D 11/322; C09D 11/36; C09D 11/38; C09D 11/102; C09D 11/107; C09D 11/30
See application file for complete search history.

(56) References Cited

U.S. PATENT DOCUMENTS 8,580,878 B2    11/2013 Hauck et al.
2014/0220315 A1*  8/2014 Zhang .................... B41M 5/405
                                                           524/451
2016/0090504 A1*  3/2016 Araki ................... C09D 167/00
                                                           522/64
2018/0147873 A1    5/2018 De Mondt et al.
2018/0371270 A1   12/2018 Graunke et al.

FOREIGN PATENT DOCUMENTS

| EP | 2842763 A2 | 3/2015 |
|---|---|---|
| EP | 3002321 A1 | 4/2016 |
| EP | 3095614 A1 | 11/2016 |
| JP | 2004314552 A | 11/2004 |
| JP | 2006-182971 A | 7/2006 |
| JP | 2009005798 A | 1/2009 |
| JP | 2009542833 A | 12/2009 |
| JP | 2011523603 A | 8/2011 |
| JP | 201547748 A | 3/2015 |
| JP | 201669654 A | 5/2016 |
| WO | 2008004002 A1 | 1/2008 |
| WO | 2013019821 A1 | 2/2013 |
| WO | 2015173552 A1 | 11/2015 |
| WO | WO-2019005798 A1 | 1/2019 |

OTHER PUBLICATIONS

Scientific Laboratory Supplies Ltd. "Poly(Methyl Methacrylate), Analytical Standard, for GPC, 10,000." Https://Www.Scientificlabs.Co. Uk, www.scientificlabs.co.uk/product/polymer-standards-and-crms/81497-500MG. Accessed Mar. 19, 2024. (Year: 2024).*
Office Action regarding Japanese Patent Application JP 2021529307, dated Jan. 5, 2023.
Japanese Office Action regarding Patent Application No. 2021529307, dated Jun. 7, 2022.
Japanese Decision to Grant regarding Patent Application No. 2021-529307, dated May 9, 2023.

* cited by examiner

*Primary Examiner* — Jennifer A Smith
*Assistant Examiner* — Jeffrey Eugene Barzach
(74) *Attorney, Agent, or Firm* — Harness, Dickey & Pierce, P.L.C.

(57) ABSTRACT

The present disclosure relates to laminatable ink, comprising a radiation-curable ink preferably in an amount, based on the laminatable ink, of ≥50 wt % to ≤99 wt %, and a thermally activatable matrix material preferably in an amount, based on the laminatable ink, of ≥1 wt % to ≤50 wt %, where the matrix material comprises at least a thermally activatable polymer, preferably in an amount, based on the laminatable ink, of ≥5 wt % to ≤30 wt %, preferably ≥8 wt % to ≤20 wt %, more preferably of ≥10 wt % to ≤15 wt %.

9 Claims, No Drawings

LAMINATABLE INK

CROSS-REFERENCE TO RELATED APPLICATIONS

This application is a U.S. National Phase Application under 35 U.S.C. 371 of International Application No. PCT/EP2020/063200, filed on May 12, 2020, which claims the benefit of European Patent Application No. 19174600.7, filed on May 15, 2019. The entire disclosures of the above applications are incorporated herein by reference.

FIELD

The present disclosure relates to a laminatable ink, the use of a laminatable ink, a decorative panel comprising a decorative layer made of laminatable ink and a method for producing a decorative panel comprising a decorative layer made of laminatable ink.

BACKGROUND

This section provides background information related to the present disclosure which is not necessarily prior art.

Decorative surfaces are used in many ways to create an appealing and individualized appearance. To this end, surfaces are often provided with a decoration by use of various printing processes. In this case, inks are transferred in desired patterns onto a surface and then fixed to form a decorative layer. In many areas it has proven to be useful to use radiation-curing inks, since they can be cured shortly after being transferred onto the surface to be printed by means of radiation, such as UV radiation or electron beams, so that they do not flow and decorative layers with particularly sharp patterns can be produced. Inks of this type are used in particular when printing is carried out on non-absorbent subsurfaces.

In particular in the production of individualized decorative surfaces inkjet printing is often used. Here, ink is transferred onto the surface to be printed via computer-controlled nozzles based on a template. Radiation-curing inks can be fixed with radiation in a known manner after the inkjet printing process. Moreover, functional surfaces are increasingly provided with surface decorations. For example, wall, ceiling and floor panels with decorations have a functional surface.

Decorated panels are known per se, wherein the term wall panel also means panels that are suitable as ceiling or door cladding. They usually consist of a carrier or core made of a solid material, for example a wood material, such as a medium-density fiberboard (MDF) or high-density fiberboard (HDF), a wood-plastic composite material (WPC) or a mineral-plastic composite material (MPC), which is provided on at least one side with a decorative layer and a cover layer and optionally with further layers, for example a wear layer arranged between the decorative and the cover layer. In the case of MDF or HDF carriers, the decorative layer is usually applied onto a printing subsurface which is disposed on the carrier and can, for example, be formed of a paper layer. Here, it is known to print the decorative layer onto the paper layer already before the paper layer is applied onto the carrier or to apply an initially unprinted paper layer onto the carrier and then to apply the decorative layer onto the paper layer by use of so-called direct printing processes. In the case of carriers based on plastic composite materials it is known to provide them with a decoration after optionally applying a printing subsurface in the direct printing process.

Such decorated surfaces usually have to meet high requirements in terms of mechanical abrasion, dirt resistance, impact resistance and the like. Frequently therefore, a wear or cover layer is usually applied onto a decorated surface. In many cases it is provided that a surface structure imitating a decorative template is introduced into such wear or cover layers, so that the surface of the decorative panel has a haptically perceptible structure, which with respect to its shape and pattern is adapted to the applied decoration in order to obtain a replica of a natural material as close to the original as possible, also with regard to the haptic.

Wear or cover layers are often applied under the influence of pressure and temperature. Such processes are also called lamination.

Here, it is important that the additional layers applied onto the decorative layer adhere well to the decorative layer or, if possible, form a bond with sufficient bond strength, in particular with a sufficient physical or chemical bond strength.

Thus, there is a need to provide radiation-curing inks with a good bondability with respect to further layers to be achieved after radiation-curing.

A disadvantage of known radiation-curing inks is that they can no longer be bonded well to other layers as a result of the curing. Accordingly, known radiation-curing inks can only be laminated with difficulty. So far, a bond has mostly been realized by applying an adhesive onto the decorative layer. However, at least one additional process step is necessary therefor.

SUMMARY

This section provides a general summary of the disclosure, and is not a comprehensive disclosure of its full scope or all of its features.

It is therefore the object of the present disclosure to provide an improved laminatable ink.

The disclosure proposes a laminatable ink comprising
a radiation-curable ink preferably in an amount, based on the laminatable ink, of ≥50 wt.-% to ≤99 wt.-%, preferably ≥70 wt.-% to ≤95 wt.-%, particularly preferably ≥80 wt.-% to ≤90 wt.-%, and
a thermally activatable matrix material, preferably in an amount, based on the laminatable ink, of ≥1 wt.-% to ≤50 wt.-%, preferably ≥5 wt.-% to ≤30 wt.-%, particularly preferably ≥10 wt.-% to ≤20 wt.-%,
wherein the matrix material comprises at least one thermally activatable polymer, preferably in an amount, based on the laminatable ink, of ≥1 wt.-% to ≤30 wt.-%, preferably ≥5 wt.-% to ≤20 wt.-%, particularly preferably ≥10 wt.-% to ≤15 wt.-%.

Further areas of applicability will become apparent from the description provided herein. The description and specific examples in this summary are intended for purposes of illustration only and are not intended to limit the scope of the present disclosure.

DETAILED DESCRIPTION

It could surprisingly be shown that a decorative layer can be produced with such a laminatable ink, in particular by means of inkjet printing, the laminatable ink is still radiation-curable and can be laminated after a radiation curing process, wherein a good bond strength can be obtained with the laminate without additionally applying an adhesive onto the decorative layer prior to lamination.

In the sense of the present disclosure, a radiation-curable ink means inks, that is to say coloring liquids, which induced by electromagnetic radiation of suitable wavelength, e.g. UV radiation or electron beams, at least partially react and solidify.

In the sense of the present disclosure, a thermally activatable polymer is to be understood as a polymer which, when exposed to temperature, softens or liquefies and can further polymerize or crosslink, in particular also after radiation curing.

In a preferred embodiment of the disclosure it can be provided that the radiation-curable ink comprises a monomer, an oligomer, a photoinitiator, a stabilizer, a dispersant and/or a dye.

In a preferred embodiment of the disclosure it can be provided that the radiation-curable ink comprises a monomer, preferably in an amount, based on the laminatable ink, of $\geq 20$ wt.-% to $\leq 70$ wt.-%, preferably $\geq 25$ wt.-% to $\leq 60$ wt.-%, particularly preferably $\geq 30$ wt.-% to $\leq 50$ wt.-%.

In the sense of the present disclosure, a monomer is to be understood as organic molecules that, initiated by photoinitiators, enter into a polymerization reaction and form polymers. Monomers initially serve as diluents, thus making the laminatable ink printable and, during polymerization, serve in particular the curing and crosslinking of the ink. Thus, monomers in the sense of this disclosure can be reactive diluents, which have an influence on the viscosity of the ink composition and crosslink to corresponding polymers even in a photoinitiated polymerization reaction.

In a preferred embodiment of the disclosure it can be provided that the radiation-curable ink comprises an oligomer, preferably in an amount, based on the laminatable ink, of $\geq 5$ wt.-% to $\leq 50$ wt.-%, preferably $\geq 8$ wt.-% to $\leq 40$ wt.-%, particularly preferably $\geq 10$ wt.-% to $\leq 20$ wt.-%.

In the sense of the present disclosure, an oligomer is to be understood as polymers with a low molecular weight which have only a small number of repeating units. Oligomers serve the adherence to the surface to be printed and in the case of a polymerization in particular also the curing and crosslinking.

In a preferred embodiment of the disclosure it can be provided that the radiation-curable ink comprises a photoinitiator, preferably in an amount, based on the laminatable ink, of $\geq 1$ wt.-% to $\leq 10$ wt.-%, preferably $\geq 3$ wt.-% to $\leq 8$ wt.-%, particularly preferably $\geq 4$ wt.-% to $\leq 6$ wt.-%.

In the sense of the present disclosure, a photoinitiator is to be understood as compounds which enter into a reaction under absorption of electromagnetic radiation, in particular absorption of light such as UV light, and form a reactive compound that can initiate a polymerization reaction.

In a preferred embodiment of the disclosure it can be provided that the radiation-curable ink comprises a stabilizer, preferably in an amount, based on the laminatable ink, of $\geq 0$ wt.-% to $\leq 5$ wt.-%, preferably $\geq 1$ wt.-% to $\leq 3$ wt.-%, particularly preferably $\geq 1.5$ wt.-% to $\leq 2.5$ wt.-%.

In the sense of the present disclosure, a stabilizer is to be understood as compounds which improve the stability of a composition.

In a preferred embodiment of the disclosure it can be provided that the radiation-curable ink comprises a dispersant, preferably in an amount, based on the laminatable ink, of $\geq 0$ wt.-% to $\leq 5$ wt.-%, preferably $\geq 1$ wt.-% to $\leq 3$ wt.-%, particularly preferably $\geq 1.5$ wt.-% to $\leq 2.5$ wt.-%.

In the sense of the present disclosure, a dispersant is to be understood as compounds which stabilize dispersions. Dispersants absorb, for example, on the surface of particles to be dispersed and thus prevent particle agglomeration.

In a preferred embodiment of the disclosure it can be provided that the radiation-curable ink comprises a dye, preferably in an amount, based on the laminatable ink, of $\geq 1$ wt.-% to $\leq 60$ wt.-%, preferably $\geq 10$ wt.-% to $\leq 50$ wt.-%, particularly preferably $\geq 20$ wt.-% to $\leq 40$ wt.-%.

In the sense of the present disclosure, a dye is to be understood as compounds which have a characteristic color.

In a preferred embodiment of the disclosure it can be provided that the radiation-curable ink, comprises a monomer in an amount of $\geq 20$ wt.-% to $\leq 70$ wt.-%, preferably $\geq 25$ wt.-% to $\leq 60$ wt.-%, particularly preferably $\geq 30$ wt.-% to $\leq 50$ wt.-%, an oligomer in an amount of $\geq 5$ wt.-%, to $\leq 50$ wt.-%, preferably $\geq 8$ wt.-% to $\leq 40$ wt.-%, particularly preferably $\geq 10$ wt.-% to $\leq 20$ wt.-%, a photoinitiator in an amount of $\geq 1$ wt.-% to $\leq 10$ wt.-%, preferably $\geq 3$ wt.-% to $\leq 8$ wt.-%, particularly preferably $\geq 4$ wt.-% to $\leq 6$ wt.-%, a stabilizer in an amount of $\geq 0$ wt.-% to $\leq 5$ wt.-%, preferably $\geq 1$ wt. % to $\leq 3$ wt.-%, particularly preferably $\geq 1.5$ wt.-% to $\leq 2.5$ wt.-%, a dispersant in an amount of $\geq 0$ wt.-% to $\leq 5$ wt.-%, preferably $\geq 1$ wt.-% to $\leq 3$ wt.-%, particularly preferably $\geq 1.5$ wt.-% to $\leq 2.5$ wt.-% and a dye in an amount of $\geq 1$ wt.-% to $\leq 60$ wt.-%, preferably $\geq 10$ wt.-% to $\leq 50$ wt.-%, particularly preferably $\geq 20$ wt.-% to $\leq 40$ wt.-%, based on the laminatable ink.

In this way, it can be achieved in an advantageous manner that the laminatable ink has good radiation-curable properties, is stable, has good color properties and the lamination ability is not adversely affected.

In a preferred embodiment of the disclosure it can be provided that the thermally activatable matrix material comprises a macromer, preferably in an amount, based on the laminatable ink, of $\geq 0$ wt.-% to $\leq 15$ wt.-%, preferably $\geq 1$ wt.-%. to $\leq 10$ wt.-%, particularly preferably $\geq 2$ wt.-% to $\leq 5$ wt.-%.

In the sense of the present disclosure, a macromer is to be understood as macromolecular compounds which have a reactive end group and are thus polymerizable. Macromers change the surface free energy of coatings, for example, and assist in adhesion.

In a preferred embodiment of the disclosure it can be provided that the thermally activatable matrix material comprises a solvent, preferably in an amount, based on the laminatable ink, of $\geq 0$ wt.-% to $\leq 5$ wt.-%, preferably $\geq 1$ wt.-% to $\leq 3$ wt.-%, particularly preferably $\geq 1.5$ wt.-% to $\leq 2.5$ wt.-%.

In the sense of the present disclosure, a solvent is to be understood as liquids which dissolve the polymer.

In a preferred embodiment of the disclosure it can be provided that the thermally activatable matrix material comprises a macromer in an amount of $\geq 0$ wt.-% to $\leq 15$ wt.-%, preferably $\geq 1$ wt.-% to $\leq 10$ wt.-%, particularly preferably $\geq 2$ wt.-% to $\leq 5$ wt.-% and optionally a solvent in an amount of $\geq 0$ wt.-% to $\leq 5$ wt.-%, preferably $\geq 1$ wt.-% to $\leq 3$ wt.-%, particularly preferably $\geq 1.5$ wt.-% to $\leq 2.5$ wt.-%, based on the laminatable ink.

As a result, it can be achieved in an advantageous manner that the laminatable ink has a good lamination ability without adversely influencing the radiation curability, the stability and the color properties.

In a particularly preferred embodiment of the disclosure it can be provided that the radiation-curable ink comprises a monomer in an amount of $\geq 20$ wt.-% to $\leq 70$ wt.-%, preferably $\geq 25$ wt.-% to $\leq 60$ wt.-%, particularly preferably $\geq 30$ wt.-% to $\leq 50$ wt.-%, an oligomer in an amount of $\geq 5$ wt.-% to $\leq 50$ wt.-%, preferably $\geq 8$ wt.-% to $\leq 40$ wt.-%, particularly preferably $\geq 10$ wt.-% to $\leq 20$ wt.-%, a photoinitiator in an amount of $\geq 1$ wt.-% to $\leq 10$ wt.-%, preferably $\geq 3$ wt.-% to $\leq 8$ wt.-%, particularly preferably ≥4 wt.-% to ≤6 wt.-%, a stabilizer in an amount of ≥0 wt.-% to ≤5 wt.-%, preferably ≥1 wt.-% to ≤3 wt.-% particularly preferably ≥1.5 wt.-% to ≤2.5 wt.-%, a dispersant in an amount of ≥0 wt.-% to ≤5 wt.-%, preferably ≥1 wt.-% to ≤3 wt.-%, particularly preferably ≥1.5 wt.-% to ≤2.5 wt.-%, and a dye in an amount of ≥1 wt.-% to ≤60 wt.-%, preferably ≥10 wt.-% to ≤50 wt.-%, particularly preferably of ≥20 wt.-% to ≤40 wt.-%, based on the laminatable ink, and the thermally activatable matrix material comprises a macromer in an amount of ≥0 wt.-% to ≤15 wt.-%, preferably ≥ 1 wt.-% to ≤10 wt.-%, particularly preferably ≥2 wt.-% to ≤5 wt.-% and optionally a solvent in an amount of ≥0 wt.-% to ≤5 wt.-%, preferably ≥1 wt.-% to ≤3 wt.-%, particularly preferably ≥1.5 wt.-% to ≤2.5 wt.-%, based on the laminatable ink.

As a result, it can advantageously be achieved that the laminatable ink has a particularly good lamination ability, radiation curability, stability and color properties.

In a preferred embodiment of the disclosure it can be provided that the monomer is an acrylate monomer.

As a result, it can advantageously be achieved that the laminatable ink can be radiation-cured particularly well.

In a preferred embodiment of the disclosure it can be provided that the monomer is selected from the group consisting of monofunctional monomers, difunctional monomers, multifunctional monomers or mixtures thereof.

By means of the various monomers the curing properties of the laminatable ink can advantageously be adjusted. In particular, this allows, for example, to adjust the molecular weight of the cured ink.

In a preferred embodiment of the disclosure it can be provided that the monomer comprises a monofunctional monomer selected from the group consisting of 2-hydroxyethyl methacrylate, 2-phenoxyethyl acrylate, isobornyl acrylate, N-vinylcaprolactam, lauryl acrylate, isodecyl acrylate, 2-carboxyethyl acrylate, glycidyl methacrylate, 2-ethyl hexyl acrylate, octyl acrylate, decyl acrylate, tridecyl acrylate and mixtures thereof.

The above-described monofunctional monomers can advantageously ensure that the laminatable ink is particularly easy to cure.

In a preferred embodiment of the disclosure it can be provided that the monomer comprises a difunctional monomer selected from the group consisting of 1,3-glycerol dimethacrylate, ethylene glycol dimethacrylate, trimethylolpropane trimethacrylate, 1,10-decanediol dimethacrylate, tetraethylene glycol dimethacrylate, ethoxylated bisphenol-A-dimethacrylate, 1,12-dodecanediol dimethacrylate, tricyclodecanedimethanol diacrylate, 1,9-nonanediol dimethacrylate and mixtures thereof.

As a result, it can advantageously be achieved that the monomer forms additional crosslinks during curing, whereby a particularly good stability of a decorative layer can be achieved.

In a preferred embodiment of the disclosure it can be provided that the monomer comprises a multifunctional monomer selected from the group consisting of ethoxylated trimethylolpropane triacrylate, glycerylpropoxy triacrylate, pentanothritol triacrylate, tetramethylolmethane tetraacrylate, trimethylolpropane triacrylate, pentaerythritol triacrylate, propoxylated trimethylolpropane triacrylate, di-pentaerythritol poly-acrylate and mixtures thereof.

As a result, it can also be achieved in an advantageous manner that the monomer forms additional crosslinks during curing, whereby a particularly good stability of a decorative layer can be achieved.

In a particularly preferred embodiment of the disclosure it can be provided that the monomer is trimethylolpropane triacrylate.

In an alternative, particularly preferred embodiment of the disclosure, it can be provided that the monomer is a mixture of isobornyl acrylate and glycidyl methacrylate.

It could surprisingly be shown that trimethylolpropane triacrylate or a mixture of isobornyl acrylate and glycidyl methacrylate is particularly suitable as a monomer, since it can advantageously be achieved that the laminatable ink can be radiation-cured particularly well and at the same time is particularly well laminatable.

In a preferred embodiment of the disclosure it can be provided that the radiation-curable ink comprises trimethylolpropane triacrylate in an amount of ≥20 wt.-% to ≤70 wt.-%, preferably ≥35 wt.-% to ≤50 wt.-%, particularly preferably ≥40 wt.-% to ≤45 wt.-% as monomer, based on the laminatable ink.

In an alternative, particularly preferred embodiment of the disclosure, it can be provided that the radiation-curable ink comprises a mixture of isobornyl acrylate and glycidyl methacrylate in an amount of ≥20 wt.-% to ≤70 wt.-%, preferably ≥25 wt.-% to ≤50 wt.-%, particularly preferably ≥30 wt.-% to ≤45 wt.-%, as monomer, based on the laminatable ink.

It could be shown in a surprising way that with these amounts of trimethylolpropane triacrylate or a mixture of isobornyl acrylate and glycidyl methacrylate advantageously a particularly good radiation curing can be achieved.

In a preferred embodiment of the disclosure it can be provided that the oligomer is an acrylate co-oligomer.

As a result, it can advantageously be achieved that the laminatable ink can be radiation-cured particularly well.

In a preferred embodiment of the disclosure it can be provided that the oligomer is selected from the group consisting of acrylic acrylate, urethane acrylate, melamine acrylate, epoxy acrylate, polyester acrylate and mixtures thereof.

In a particularly preferred embodiment of the disclosure it can be provided that the oligomer is urethane acrylate.

In an alternative, particularly preferred embodiment of the disclosure, it can be provided that the oligomer is melamine acrylate.

Surprisingly, it could be shown that urethane acrylate or melamine acrylate are particularly suitable as oligomers, since in this way it can advantageously be achieved that the laminatable ink can be radiation-cured particularly well and at the same time can be laminated particularly well.

In a particularly preferred embodiment of the disclosure it can be provided that the radiation-curable ink comprises urethane acrylate in an amount of ≥5 wt.-% to ≤50 wt.-%, preferably ≥8 wt.-% to ≤20 wt.-%, particularly preferably ≥10 wt.-% to ≤15 wt.-%, as oligomer, based on the laminatable ink.

In an alternative, particularly preferred embodiment of the disclosure, it can be provided that the radiation-curable ink comprises melamine acrylate in an amount of ≥5 wt.-% to ≤50 wt.-%, preferably ≥8 wt.-%, to ≤20 wt.-%, particularly preferably ≥10 wt.-% to ≤15 wt.-%, as oligomer, based on the laminatable ink.

It could surprisingly be shown that with these amounts of urethane acrylate or melamine acrylate advantageously a particularly good radiation curing can be achieved.

In a preferred embodiment of the disclosure it can be provided that the oligomer has a molecular weight in a range of ≥500 g/mol to ≤5,000 g/mol.

In a preferred embodiment of the disclosure it can be provided that the photoinitiator is selected from the group consisting of benzophenone, alpha ketone, thiophenyl morpholine propanone, thioxanthone and mixtures thereof.

As a result, it can advantageously be achieved that curing can be initiated well by radiation of a corresponding wavelength range, for example by UV radiation.

In a particularly preferred embodiment of the disclosure it can be provided that the photoinitiator is alpha ketone.

In an alternative, particularly preferred embodiment of the disclosure, it can be provided that the photoinitiator is thiophenyl morpholine propanone.

In a particularly preferred embodiment of the disclosure it can be provided that the radiation-curable ink comprises alpha ketone in an amount of ≥1 wt.-% to ≤10 wt.-%, preferably ≥3 wt.-% to ≤8 wt.-%, particularly preferably ≥4 wt.-% to ≤6 wt.-%, as photoinitiator, based on the laminatable ink.

In an alternative, particularly preferred embodiment of the disclosure, it can be provided that the radiation-curable ink comprises thiophenyl morpholine propanone in an amount of ≥1 wt.-% to ≤10 wt.-%, preferably ≥3 wt.-% to ≤8 wt.-%, particularly preferably ≥4 wt.-% to ≤5 wt.-%, as photoinitiator, based on the laminatable ink.

In a preferred embodiment of the disclosure it can be provided that the dispersant is selected from the group consisting of Efka 4000, Efka 5000, Efka 6000, Dispex, ultradisperse, RAD-SPERSE and mixtures thereof.

As a result, it can be achieved in an advantageous manner that the color of the laminatable ink is uniform without adversely affecting the lamination ability or radiation curability.

In a particularly preferred embodiment of the disclosure it can be provided that the radiation-curable ink comprises RAD-SPERSE in an amount of ≥0 wt.-% to ≤5 wt.-%, preferably ≥1 wt.-% to ≤3 wt.-%, particularly preferably ≥1.5 wt.-% to ≤2.5 wt.-%, as dispersant, based on the laminatable ink.

In a preferred embodiment of the disclosure it can be provided that the stabilizer is selected from the group consisting of 2-hydroxy-4-octyloxybenzophenone, 2-(2-hydroxy-5-methylphenyl) benzotriazole, 2,2-dihydroxy-4,4-dimethoxybenzophenone and mixtures thereof.

As a result, it can advantageously be achieved that the laminatable ink is thermally stable.

In a particularly preferred embodiment of the disclosure it can be provided that the radiation-curable ink comprises 2-hydroxy-4-octyloxybenzophenone in an amount of ≥0 wt.-% to ≤5 wt.-%, preferably ≥1 wt.-% to ≤3 wt.-%, particularly preferably ≥1.5 wt.-% to ≤2.5 wt.-%, as dispersant, based on the laminatable ink.

As a result, it can advantageously be achieved that the laminatable ink is thermally stable and the radiation curability and lamination ability of the ink are not impaired.

According to a further embodiment of the disclosure, it can be provided that the laminatable ink comprises an inhibitor. This inhibitor can preferably be included in the laminatable ink in an amount of ≥0 wt.-% to ≤2 wt.-%, preferably ≥0.005 wt.-% to ≤1 wt.-%, particularly preferably ≥0.01 wt.-% to ≤0.1 wt.-%.

According to a further embodiment of the disclosure, the inhibitor can be at least one compound which is selected from a group consisting of hydroquinone, methoxy methyl hydroquinone, p-benzoquinone, p-methoxyquinone, phenothiazine, mono-tert-butylhydroquinone, 1,2-dihydroxybenzene, p-tert-butylcatechol, benzoquinone, 2,5-di-tert-butylhydroquinone, 2,5-p-dimethyl-p-bezoquinone, anthraquinone, 2,6-di-tert-butylhydroxytoluene and organic phosphites.

The provision of an appropriate inhibitor can advantageously reduce exothermic decomposition of the laminatable ink and serve the control of the photoinitiated polymerization.

In a preferred embodiment of the disclosure it can be provided that the dye is an organic and/or inorganic pigment.

In a preferred embodiment of the disclosure it can be provided that the dye is selected from the group designated by the Color Index, consisting of NB1, NB2, PB1, PB1:2, PB15:1, NBr3, NBr7, NBr9, PBr1, NY2, NY3, NY6, NY10, NY11, NY12, NY13, NY14, PY1, PY2, PY3, PY4, PY5, PY6, NG1, NG2, PG1, PG2, PG4, PG13, NO2, NO4, NO5, NO6, PO17, PO20, NR1, NR2, NR11, NR23, NV1, PV1, PV1:1, PV1:3, PV3:3, NBK3, NBK6, NBK9, PBK11 and mixtures thereof.

As a result, the color of the dye can advantageously be set as desired, without in particular adversely affecting the radiation curability and lamination ability.

In a preferred embodiment of the disclosure it can be provided that the dye has an average particle size of less than or equal to 200 nm, preferably less than or equal to 100 nm.

In the sense of the present disclosure, the average particle size is to be understood as the volumetrically averaged mean particle diameter $D_{50}$, measured by means of laser diffractometry.

In this way it can advantageously be achieved that the ink has a uniform color and can be printed well by use of inkjet printers. In particular, clogging of the printing nozzles can thereby be prevented.

In a preferred embodiment of the disclosure it can be provided that the polymer is a UV-stable polymer.

In this way it can be achieved that the thermally activatable matrix material is not impaired during radiation curing by means of UV radiation.

In a preferred embodiment of the disclosure it can be provided that the polymer is selected from the group consisting of polymethyl methacrylate, copolyacrylate, thermoplastic polyurethane, copolyamide, copolyester, liquid polybutadiene, colophony-modified polyisobutene and mixtures thereof.

Surprisingly, it could be shown that these polymers are particularly suitable as polymers.

In a preferred embodiment of the disclosure it can be provided that the polymer has a number average molecular weight in a range of ≥700 g/mol to ≤20,000 g/mol.

In a preferred embodiment of the disclosure it can be provided that the polymer comprises polymethyl methacrylate with a number average molecular weight in a range of ≥700 g/mol to ≤15,000 g/mol.

In a preferred embodiment of the disclosure it can be provided that the polymer comprises thermoplastic polyurethane with a number average molecular weight in a range of ≥1,500 g/mol to ≤20,000 g/mol.

In a preferred embodiment of the disclosure it can be provided that the polymer comprises copolyamide with a number average molecular weight in a range of ≥2,000 g/mol to ≤18,000 g/mol.

In a preferred embodiment of the disclosure it can be provided that the polymer comprises copolyester with a number average molecular weight in a range of ≥3,000 g/mol to ≤20,000 g/mol.

In a preferred embodiment of the disclosure it can be provided that the polymer comprises liquid polybutadiene with a number average molecular weight in a range of ≥1,000 g/mol to ≤3,000 g/mol.

By means of the above-described polymers it can advantageously be achieved that the matrix material is activated during lamination and the decorative layer with a laminated cover layer forms a stable bond with good bond strength. In particular, by means of the above-described polymers it can be achieved that the physical properties of the laminatable ink are not impaired too much, so that a good printability and also a good radiation curability are maintained.

In a preferred embodiment of the disclosure it can be provided that the polymer has an average particle size of less than or equal to 500 µm, preferably less than or equal to 80 µm, particularly preferably less than or equal to 1 µm.

As a result, it can advantageously be achieved that the polymer can be present in a well-distributed manner in the laminatable ink, so that the lamination ability is consistently good over an entire printing area.

In a preferred embodiment of the disclosure it can be provided that the polymer comprises polymethyl methacrylate with an average particle size of less than or equal to 150 µm.

In a preferred embodiment of the disclosure it can be provided that the polymer comprises thermoplastic polyurethane with an average particle size of less than or equal to 170 µm, in particular less than or equal to 2 µm.

In a preferred embodiment of the disclosure it can be provided that the polymer comprises copolyester and/or copolyamide with an average particle size of less than or equal to 400 µm, in particular less than or equal to 1 µm.

It could surprisingly be shown that the ranges described above are particularly well suited for the specific polymers.

In a preferred embodiment of the disclosure it can be provided that the polymer comprises polymethyl methacrylate with a melting range of ≥170° C. to ≤ 210° C.

In a preferred embodiment of the disclosure it can be provided that the polymer comprises thermoplastic polyurethane with a melting range of ≥105° C. to ≤ 132° C.

In a preferred embodiment of the disclosure it can be provided that the polymer comprises copolyamide with a melting range of ≥118° C. to ≤128° C.

In a preferred embodiment of the disclosure it can be provided that the polymer comprises copolyester with a melting range of ≥110° C. to ≤120° C.

In a preferred embodiment of the disclosure it can be provided that the polymer is a copolyacrylate and/or a liquid polybutadiene.

In a particularly preferred embodiment of the disclosure it can be provided that the polymer is a copolyacrylate with a viscosity in a range of greater than or equal to 300 mPa s to less than or equal to 500 mPa s, measured according to EN ISO 3219.

In a particularly preferred embodiment of the disclosure it can be provided that the polymer is a liquid polybutadiene with a viscosity in a range of greater than or equal to 200 mPa s to less than or equal to 450 mPa s, measured according to EN ISO 3219.

As a result, it can advantageously be achieved that the corresponding polymer produces a good thermal activatability of the matrix material and at the same time has a viscosity that allows a good printability of the laminatable ink.

In a preferred embodiment it can be provided that the polymer can be laminated in a temperature range of greater than or equal to 100° C. to less than or equal to 130° C.

In a preferred embodiment of the disclosure it can be provided that the polymer is selected from tackifying agents, also called tackifiers. For example, the polymer can preferably be a colophony ester resin, in particular a colophony ester-modified polyisobutene.

In a particularly preferred embodiment of the disclosure it can be provided that the matrix material comprises polymethyl methacrylate with a number average molecular weight in a range of ≥700 g/mol to ≤15,000 g/mol and a melting range of ≥170° C. to ≤210° C.

In a preferred embodiment of the disclosure it can be provided that the matrix material comprises thermoplastic polyurethane with a number average molecular weight in a range of ≥1,500 g/mol to ≤20,000 g/mol and a melting range of ≥ 105° C. to ≤132° C.

In a preferred embodiment of the disclosure it can be provided that the macromer is selected from the group consisting of polyoxyethylene chlorotriazine, polyoxypropylene chlorotriazine, polyethylene glycol, polyether, polystyrene butyl acrylate and mixtures thereof.

In a preferred embodiment of the disclosure it can be provided that the macromer has a molecular weight in a range of ≥150 g/mol to ≤400 g/mol.

In a preferred embodiment of the disclosure it can be provided that the macromer is polyethylene glycol.

In an alternative preferred embodiment of the disclosure, it can be provided that the macromer is polyether.

In a particularly preferred embodiment of the disclosure it can be provided that the macromer is polyethylene glycol and the polymer is thermoplastic polyurethane.

In an alternative, particularly preferred embodiment of the disclosure it can be provided that the macromer is polyether and the polymer is polymethylene methacrylate.

In an alternative embodiment of the disclosure it can be provided that the matrix material does not comprise a macromer and the polymer is liquid polybutadiene.

By means of the above-described embodiments it can advantageously be achieved that the laminatable ink can form a particularly strong bond with a cover layer.

In a preferred embodiment of the disclosure it can be provided that the solvent is selected from the group consisting of cyclohexanone, butanone, methyl ethyl ketone, xylene, ethyl acetate, ethyl lactate, dimethyl sulfoxide, dimethylformamide, formic acid and mixtures thereof.

As a result, it can advantageously be achieved that the polymer is particularly well dispersed or even dissolved in the laminatable ink. In this way a particularly homogeneous distribution of the polymer can be achieved.

The disclosure also proposes the use of a laminatable ink described above for producing a decorative layer.

In one embodiment of the disclosure, the laminatable ink is used to pro-duce a laminated decorative layer of a decorative panel.

Through the use according to the disclosure it can be achieved that surfaces can be provided with a decoration and a protective layer can be applied directly onto the decoration.

The disclosure also proposes a decorative panel comprising a decorative layer with a decoration made from a previously described laminatable ink.

The use of the decorative panels according to the disclosure enables to realize particularly well-detailed decorative surfaces, wherein the decorative surfaces can be protected by at least one protective layer.

The disclosure also proposes a method for producing a decorative panel comprising a decorative layer with a decoration made from a previously described laminatable ink.

To this end, the method comprises at least the following steps:

a. providing a plate-shaped carrier,
b. printing a decoration with a previously described laminatable ink onto at least a part of the plate-shaped carrier,
c. curing the decoration with electromagnetic radiation, preferably with UV radiation,
d. laminating at least a partial area of the decoration with a wear and/or cover layer,
wherein the cured ink is thermally activated during the lamination of the decoration and forms a bond with the laminate.

A "carrier" can be understood in particular as a layer which serves as a core or as a base layer in a finished panel and which in particular can comprise a natural material, such as a wood-based material, a fiber material or a material comprising a plastic. For example, the carrier can already impart the panel a suitable stability or contribute thereto.

Wood-based materials in the sense of the disclosure in addition to solid wood materials are materials such as cross-laminated timber, glue-laminated timber, blockboard, veneered plywood, laminated veneer lumber, parallel strand lumber and bending plywood. In addition, wood-based materials in the sense of the disclosure are also chipboards such as pressboards, extruded boards, oriented structural boards (OSB) and laminated strand lumber as well as wood fiber materials such as wood fiber insulation boards (HFD), medium hard and hard fiberboards (MB, HFH) and in particular medium density fiberboards (MDF) and high density fiberboards (HDF). Even modern wood-based materials such as wood polymer materials (wood plastic composite, WPC), sandwich boards made of a lightweight core material such as foam, rigid foam or honeycomb paper and a layer of wood applied thereon, and minerally hardened, for example with cement, chipboards are wood-based materials in the sense of the disclosure. Moreover, cork represents a wood-based material in the sense of the disclosure.

Plastics that can be used in the production of corresponding panels or the carriers are, for example, thermoplastics such as polyvinyl chloride, polyolefins (for example polyethylene (PE), polypropylene (PP)), polyamides (PA), polyurethane (PU), polystyrene (PS), acrylonitrile butadiene styrene (ABS), polymethyl methacrylate (PMMA), polycarbonate (PC), polyethylene terephthalate (PET), polyether ether ketone (PEEK) or mixtures or co-polymerizates thereof. The plastics can contain com-mon fillers, such as calcium carbonate (chalk), aluminum oxide, silica gel, quartz flour, wood flour, talc, fly ash, gypsum. They can also be colored in a known manner.

A "web-like carrier" can be understood as a carrier that in its manufacturing process, for example, has a web-like and thus, compared to its thickness or width, significantly greater length and the length of which can, for example, be greater than 15 meters.

In the sense of the present disclosure, a "plate-shaped carrier" can further be understood as a carrier which is formed by separation from the web-like carrier and is formed in the shape of a plate. Moreover, the plate-shaped carrier may already define the shape and/or size of the panel to be produced. However, the plate-shaped carrier can also be provided as a large plate. A large plate in the sense of the disclosure is in particular a carrier whose dimensions several times exceed the dimensions of the final decorative panels, and which in the course of the manufacturing process is separated in a corresponding plurality of decorative panels, for example by sawing, laser or water jet cutting. For example, the large plate can correspond to the web-like carrier.

In the sense of the present disclosure, lamination means a firmly bond of two layers by the action of pressure and/or temperature.

In the sense of the present disclosure, thermally activation is also to be understood as a second, thermal curing.

In one embodiment of the disclosure it can be provided that between steps a) and b) a printing subsurface is applied onto the plate-shaped carrier.

In the sense of the present disclosure, a printing subsurface is to be understood as a layer which allows improved adhesion of the ink on the plate-shaped carrier.

Here, the printing of the decoration by use of the above-described laminatable ink onto the plate-shaped carrier can be realized by a conventional method. For example, it can be provided that the decoration is produced with the laminatable ink in a flexographic printing, offset printing or screen printing process. It can preferably be provided that the decoration with the laminatable ink is produced by use of a digital printing technique, such as in particular an inkjet process.

In this way it can be achieved that in particular individual decorations can be produced.

In a preferred embodiment of the disclosure it can be provided that the decoration is produced from a plurality of previously described laminatable inks of different colors.

In this way, in particular, multicolored decorations can be produced.

In one embodiment of the disclosure it can be provided that the curing of the decoration is realized with electromagnetic radiation, preferably with UV radiation.

Here, UV radiation can be understood, in particular, as radiation in a wavelength range of, for example, 10-450 nm, such as 100-380 nm.

In this way it can advantageously be achieved that the laminatable ink is cured without impairing the thermal reactivability of the matrix.

In this case, such radiation can be generated, for example, in a manner known per se by using medium-pressure emitters. For example, a gas discharge lamp such as a mercury vapor lamp can be used.

In one embodiment of the disclosure it can be provided that the wear and/or cover layer is a lacquer, a resin or a film.

In one embodiment of the disclosure, the cover layer can be, for example, a liquid, lacquer-containing cover layer which is at least partially thermally cured, wherein the cured ink can be activated thermally and bonds with the cured cover layer.

In one embodiment of the disclosure it can be provided that the wear and/or cover layer is placed on the printed carrier as a pre-produced overlay layer, e.g. based on melamine and is bonded therewith by the action of pressure and/or heat, wherein the cured ink can be activated thermally and bonds with the wearing and/or cover layer.

Furthermore, it can be preferred that for forming the wear and/or cover layer a radiation-curable composition, such as a radiation-curable lacquer, e.g. an acrylic lacquer is applied. Here, it can be provided that the wear layer includes hard materials such as titanium nitride, titanium carbide, silicon nitride, silicon carbide, boron carbide, tungsten carbide, tantalum carbide, aluminum oxide (corundum), zirconium oxide or mixtures thereof in order to increase the wear resistance of the layer. The application can, for example, be implemented by means of rollers, such as rubber rollers, or by means of pouring devices.

In a preferred embodiment of the disclosure it can be provided that the cured ink is thermally activated during lamination at a temperature in a range of greater than or equal to 100° C. to less than or equal to 150° C.

In a particularly preferred embodiment of the disclosure it can be provided that the laminatable ink comprises polymethyl methacrylate as a polymer and the cured ink is thermally activated at a temperature in a range of greater than or equal to 130° C. to less than or equal to 140° C.

In a particularly preferred embodiment of the disclosure it can be provided that the laminatable ink comprises thermoplastic polyurethane as a polymer and the cured ink is thermally activated at a temperature in a range of greater than or equal to 100° C. to less than or equal to 120° C.

In a particularly preferred embodiment of the disclosure it can be provided that the laminatable ink comprises copolyamide as a polymer and the cured ink is thermally activated at a temperature in a range of greater than or equal to 125° C. to less than or equal to 145° C.

In a particularly preferred embodiment of the disclosure it can be provided that the laminatable ink comprises copolyester as a polymer and the cured ink is thermally activated at a temperature in a range of greater than or equal to 105° C. to less than or equal to 115° C.

In a particularly preferred embodiment of the disclosure it can be provided that the laminatable ink comprises liquid polybutadiene as a polymer and the cured ink is thermally activated at a temperature in a range of greater than or equal to 110° C. to less than or equal to 130° C.

In a particularly preferred embodiment of the disclosure it can be provided that the laminatable ink comprises colophony-modified polyisobutene as a polymer and the cured ink is thermally activated at a temperature in a range of greater than or equal to 100° C. to less than or equal to 120° C.

As a result of the temperature ranges described above, it can be achieved that the cured inks are thermally activated particularly well.

In a preferred embodiment of the disclosure it can be provided that the decorative layer and the wear and/or cover layer are pressed together during lamination with a pressure in a range of greater than or equal to 2 bar to 70 bar, preferably greater than or equal to 10 bar to 50 bar.

In a particularly preferred embodiment of the disclosure it can be provided that the laminatable ink comprises polymethyl methacrylate as a polymer and the decorative layer and the wear and/or cover layer are pressed together during lamination with a pressure in a range of greater than or equal to 5 bar to 70 bar, preferably greater than or equal to 15 bar to 60 bar.

In a particularly preferred embodiment of the disclosure it can be provided that the laminatable ink comprises thermoplastic polyurethane as a polymer and the decorative layer and the wear and/or cover layer are pressed together during lamination with a pressure in a range of greater than or equal to 2 bar to 55 bar, preferably greater than or equal to 8 bar to 50 bar.

In a particularly preferred embodiment of the disclosure it can be provided that the laminatable ink comprises copolyamide as a polymer and the decorative layer and the wear and/or cover layer are pressed together during lamination with a pressure in a range of greater than or equal to 2 bar to 70 bar, preferably greater than or equal to 7 bar to 65 bar.

In a particularly preferred embodiment of the disclosure it can be provided that the laminatable ink comprises copolyester as a polymer and the decorative layer and the wear and/or cover layer are pressed together during lamination with a pressure in a range of greater than or equal to 3 bar to 70 bar, preferably greater than or equal to 4 bar to 63 bar.

In a particularly preferred embodiment of the disclosure it can be provided that the laminatable ink comprises liquid polybutadiene as a polymer and the decorative layer and the wear and/or cover layer are pressed together during lamination with a pressure in a range of greater than or equal to 4 bar to 70 bar, preferably greater than or equal to 5 bar to 55 bar.

In a particularly preferred embodiment of the disclosure it can be provided that the laminatable ink comprises colophony-modified polyisobutene as a polymer and the decorative layer and the wear and/or cover layer are pressed together during lamination with a pressure in a range of greater than or equal to 2 bar to 70 bar, preferably greater than or equal to 5 bar to 45 bar.

In a particularly preferred embodiment of the disclosure it can be provided that the laminatable ink comprises liquid polybutadiene and colophony-modified polyisobutene as a polymer and the decorative layer and the wear and/or cover layer are pressed together during lamination with a pressure in a range of greater than or equal to 4 bar to 70 bar, preferably greater than or equal to 5 bar to 55 bar.

As a result of the pressure ranges described above, it can be achieved that the decorative layer and the wear and/or cover layer have a particularly high bond strength.

Furthermore, the cover and/or wear layer can comprise means for reducing the static (electrostatic) charging of the final laminate. For example, to this end it can be provided that the cover and/or wear layer comprises compounds such as choline chloride. The antistatic agent can be used, for example, in a concentration between ≥0.1 wt.-% and ≤40.0 wt.-%, preferably between ≥1.0 wt.-% and ≤30.0 wt.-% in the cover and/or composition for forming the wear layer.

Moreover, it can be provided that in the protective layer or in the wear or cover layer a structuring, in particular a surface structure matching with the decoration, is formed by introducing pores. To this end, it may be provided that the carrier plate already has a structure, and an alignment of a printing tool for applying the decoration and the carrier plate relative to each other is carried out depending on the structure of the carrier plate detected by optical methods. For aligning the printing tool and the carrier plate relative to each other it may be provided that a relative movement between the printing tool and the carrier plate necessary for the alignment is carried out by a displacement of the carrier plate or by a displacement of the printing tool. Furthermore, it may be provided that a structuring of the decorative panels is implemented after the application of the cover and/or wear layer. For this purpose, it may be preferably provided that as a cover and/or wear layer a curable composition is applied and a curing process is carried out only to the extent that only a partial curing of the cover and/or wear layer occurs. In the thus partially cured layer a desired surface structure is embossed by means of suitable tools, such as a hard metal structure roller or a die. Herein, the embossing process is carried out in accordance with the applied decoration. In order to ensure a sufficient matching of the structure to be introduced with the decoration it may be provided that the carrier plate and the embossing tool are aligned relative to each other by corresponding relative movements. Subsequently to the introduction of the desired structure into the partially cured cover and/or wear layer a further curing process of the now structured cover and/or wear layer is carried out.

In addition, a backing layer may be applied onto the side opposite to the decorative side.

Hereinafter, the disclosure is explained in more detail based on examples. The examples show possible embodiments of the disclosure. In principle, however, combinations or modifications of the embodiments are also possible within the scope of the disclosure.

Examples of compositions of laminatable inks according to the disclosure are given in the tables below. In this context, wt.-% means the mass percentage based on the laminatable ink.

The laminatable ink according to Example 1 was violet in color and could be cured particularly well with UV radiation after it had been applied onto a carrier in an inkjet printing process.

The decorative layer obtained was laminated with a wear protection layer in a press at 110° C. and with a pressure of 10 bar. In this way a stable bond was formed without an adhesive having to be applied between the decorative layer and the wear protection layer.

Example 1

| Material | wt.-% |
| --- | --- |
| Isobornylacrylate, glycidyl methacrylate | 30-35% |
| Urethane acrylate | 10-15% |
| Polyethylene glycol | 5% |
| Liquid polybutadien | 5-10% |
| Thiophenyl morpholine propanone | 5% |
| RAD-SPERSE | 2% |
| 2-hydroxy-4-octyloxybenzophenone | 2% |
| PV3:3 | 30-35% |
| Colophony ester-modified polyisobutene | 2-5% |

The laminatable ink according to example 2 was brown in color and could be cured particularly well with UV radiation after it had been applied onto a carrier in an inkjet printing process. The decorative layer obtained was also laminated with a wear protection layer in a press at 110° C. and with a pressure of 2.5 bar. In the process, a stable bond was formed without an adhesive having to be applied between the decorative layer and the wear protection layer.

Example 2

| Material | wt.-% |
| --- | --- |
| Trimethylolpropane triacrylate | 37-45% |
| Melamine acrylate | 10% |
| Polyethylene glycol | 5% |
| Thermoplastic polyurethane | 15% |
| Alpha ketone | 4% |
| RAD-SPERSE | 2% |
| 2-Hydroxy-4-octyloxybenzophenone | 2% |
| NBr3 | 17-25% |

The laminatable ink according to example 3 was green in color and could also be cured particularly well with UV radiation after it had been applied onto a carrier in an inkjet printing process. The decorative layer obtained was laminated with a wear protection layer in a press at 135° C. and with a pressure of 8 bar. In the process, a stable bond was also formed, without an adhesive having to be applied between the decorative layer and the wear protection layer.

Example 3

| Material | wt.-% |
| --- | --- |
| Isobornylacrylate, glycidyl methacrylate | 36-41% |
| Urethane acrylate | 15% |

-continued

Example 3

| Material | wt.-% |
| --- | --- |
| Polyether | 5% |
| Copolyacrylate | 10% |
| Thiophenyl morpholine propanone | 5% |
| RAD-SPERSE | 2% |
| 2-hydroxy-4-octyloxybenzophenone | 2% |
| PG4 | 20-25% |

The laminatable ink according to example 4 was yellow in color and could also be cured particularly well with UV radiation after it had been applied onto a carrier in an inkjet printing process. The decorative layer obtained was laminated with a wear protection layer in a press at 130° C. and with a pressure of 5 bar. In the process, a stable bond was also formed, without an adhesive having to be applied between the decorative layer and the wear protection layer.

Example 4

| Material | wt.-% |
| --- | --- |
| Isobornylacrylate, glycidyl methacrylate | 30% |
| Urethane acrylate | 15% |
| Liquid polybutadien | 11-20% |
| Alpha ketone | 5% |
| RAD-SPERSE | 2% |
| 2-Hydroxy-4-octyloxybenzophenone | 2% |
| NY11 | 26-35% |

The invention claimed is:

1. A laminatable ink, comprising
a radiation-curable ink, in an amount, based on the laminatable ink, of ≥50 wt.-% to ≤99 wt.-%; and
a thermally activatable matrix material, in an amount, based on the laminatable ink, of ≥1 wt.-% to ≤50 wt.-%, wherein the matrix material comprises at least one thermally activatable polymer in an amount, based on the laminatable ink, of ≥1 wt.-% to ≤30 wt.-%, wherein the radiation-curable ink comprises a monomer, an oligomer, a photoinitiator, a stabilizer, an inhibitor, a dispersant and a dye, wherein the radiation-curable ink comprises a monomer in an amount of ≥25 wt.-% to ≤60 wt.-%, an oligomer in an amount of ≥5 wt.-% to ≤50 wt.-%, a photoinitiator in an amount of ≥1 wt.-% to ≤10 wt.-%, a stabilizer in an amount of ≥1 wt.-% to ≤3 wt.-%, a dispersant in an amount of ≥1 wt.-% to ≤3 wt.-%, and a dye in an amount of ≥1 wt.-% to ≤60 wt.-%, based on the laminatable ink, and the thermally activatable ink matrix material comprises a macromer in an amount of ≥1 wt.-% to ≤10 wt.-% and optionally a solvent in an amount of ≥0 wt.-% to ≤5 wt.-%, based on the laminatable ink, wherein the monomer comprises a monofunctional monomer, a difunctional monomer, and/or the monomer of trimethlolpropane trimethacrylate, wherein the monofunctional monomer is isobornyl acrylate, and wherein the difunctional monomer is selected from the group consisting of 1,3-glycerol dimethacrylate, 1,10-decanediol dimethacrylate, tricyclodecane dimethanol diacrylate, 1,9-nonanediol dimethacrylate and mixtures thereof.

2. The laminatable ink according to claim 1, wherein the oligomer is selected from the group consisting of acrylic acrylate, urethane acrylate, melamine acrylate, epoxy acrylate, polyester acrylate and mixtures thereof.

3. The laminatable ink according to claim 1, wherein the photoinitiator is selected from the group consisting of benzophenone, alpha ketone, thiophenyl morpholine propanone, thioxanthone and mixtures thereof.

4. The laminatable ink according to claim 1, wherein the polymer is selected from the group consisting of polymethyl methacrylate, copolyacrylate, thermoplastic polyurethane, copolyamide, copolyester, liquid polybutadiene, colophony-modified polyisobutene and mixtures thereof.

5. The laminatable ink according to claim 1, wherein the polymer has a number average molecular weight in a range of $\geq 700$ g/mol to $\leq 20,000$ g/mol.

6. The laminatable ink according to claim 1, wherein the macromer is selected from the group consisting of polyoxyethylene chlorotriazine, polyoxypropylene chlorotriazine, polyethylene glycol, polyether, polystyrene butyl acrylate and mixtures thereof.

7. The laminatable ink according to claim 1, wherein the solvent is selected from the group consisting of cyclohexanone, butanone, methyl ethyl ketone, xylene, ethyl acetate, ethyl lactate, dimethyl sulfoxide, dimethylformamide, formic acid and mixtures thereof.

8. A decorative panel comprising a decorative layer with a decoration produced by use of a laminatable ink according to claim 1.

9. A method for producing a decorative panel according to claim 8, comprising at least the method steps:
   a. providing a plate-shaped carrier;
   b. printing a decoration with the laminatable ink onto at least a part of the plate-shaped carrier;
   c. curing the decoration with electromagnetic radiation, preferably with UV radiation;
   d. laminating at least a partial area of the decoration with a wear and/or cover layer, wherein the cured ink is thermally activated during the lamination of the decoration and forms a bond with the laminate.

* * * * *